United States Patent
Hooper

(10) Patent No.: US 7,156,263 B2
(45) Date of Patent: Jan. 2, 2007

(54) SYSTEM AND METHOD FOR METERING FIBROUS MATERIAL

(76) Inventor: Larry Hooper, Box 27, Site 7, R.R. #2, Didsbury, Alberta (CA) T0M 0W0

( * ) Notice: Subject to any disclaimer, the term of this patent is extended or adjusted under 35 U.S.C. 154(b) by 200 days.

(21) Appl. No.: 10/771,120

(22) Filed: Feb. 4, 2004

(65) Prior Publication Data

US 2004/0178228 A1 Sep. 16, 2004

Related U.S. Application Data

(60) Provisional application No. 60/444,643, filed on Feb. 4, 2003.

(51) Int. Cl.
*G01F 11/20* (2006.01)
*G01F 11/00* (2006.01)
*B65G 47/44* (2006.01)
*B65G 65/34* (2006.01)

(52) U.S. Cl. .................. 222/415; 222/408; 198/532; 198/550.2; 198/803.1

(58) Field of Classification Search ............... 366/20; 406/32; 221/160, 161, 217, 218, 200; 198/550.8, 198/688.1, 698, 699, 168.01, 168.2, 169.1, 198/170.1, 184.1, 867.1, 803.13, 468.01, 198/468.2, 469.1, 470.1, 484.1, 494, 497, 198/499, 550.2, 532; 53/282; 83/155; 209/521; 460/114; D34/29; 222/342, 408, 415; 19/301, 19/296, 300

See application file for complete search history.

(56) References Cited

U.S. PATENT DOCUMENTS

| | | | | |
|---|---|---|---|---|
| 3,967,719 A | * | 7/1976 | Kloefkorn et al. | ..... 198/550.12 |
| 5,599,095 A | * | 2/1997 | Elkin | ........................ 366/30 |
| 5,782,337 A | * | 7/1998 | Langland | ............... 198/803.1 |
| 5,873,150 A | * | 2/1999 | Gerard | ....................... 19/301 |

* cited by examiner

*Primary Examiner*—Gene O. Crawford
*Assistant Examiner*—Timothy Waggoner
(74) *Attorney, Agent, or Firm*—Ryan W. Dupuis; Michael R. Williams; Adrian D. Buttison

(57) ABSTRACT

A system and method are used to meter fibrous material into a concrete mixture. The system includes an endless conveyor belt rotatably supported on first and second rollers. Pick up members on the belt project into the direction of travel for collecting fibrous material as the belt is rotated through a container having fibrous material therein. The fibrous material is released as the belt is rotated over the second roller where the pick up members are moved away from the belt at the free end thereof due to curvature of the belt. A sweeper mechanism may be provided at the second roller to assist in releasing the fibrous material from the pickup members. The configuration of the container permits any brand or type of fibres to be readily used while still maintaining a consistent delivery or discharge of fibres which is proportional to the movement of the conveyor.

17 Claims, 4 Drawing Sheets

SYSTEM AND METHOD FOR METERING FIBROUS MATERIAL

This application claims priority under 35 U.S.C. Section 119(e) to Provisional Patent Application Ser. No. 60/444,643 filed on Feb. 4, 2003.

FIELD OF THE INVENTION

The present invention relates to a metering system and more particularly to a system and method for metering fibrous material, for example fibres suitable for use in composite materials including concrete and the like.

BACKGROUND

The use of fibrous material is commonly known in various types of mixtures and composite materials. Fibres known under trade names such as "Fibre Mesh" and "Nycon" are known to be used in concrete mixes for improving certain performance characteristics of the concrete. When using a volumetric batching system for mixing concrete, fibrous material is required to be mixed with other components of the mixture in a metered flow as opposed to a typical central batch system that measures components in a separate plant and then charges a mixer. In the central batch system a measured amount of fibres are added to the concrete batch and distributed through the mass during a mixing process. The volumetric system however requires that the fibrous material be fed as a flow rate in a continuous and consistent fashion.

Fibres used in the concrete industry however have proven to be very difficult to meter mechanically. One known method includes packaging the fibres in a tube and, using a hydraulic of air cylinder, press them through an orifice where a set of rotating fingers break them apart and draw them through the orifice in a somewhat metered fashion. The metering rate is determined by the movement of the hydraulic cylinder. This system is owned by a US manufacturer known as Cemen-tec. Problems with this system include the requirement for an end user to purchase the fibre product from a single supplier who packages the product into the required tubes. Furthermore because the fibre product is compressive, the delivery of the fibres is not always proportional to the movement of the cylinder and therefore feed is not consistent. If pressure is not released, fibres may be continued to be dispensed beyond what is desired and upon subsequent resuming of delivery of fibres, there may be a certain amount of delay due to movement of the cylinder that must occur before the fibres are discharged when sufficient pressure is again built up. This is particularly a problem with concrete as it is frequently delivered in small quantities such as into wheelbarrows. In general the known systems for dispensing fibrous material are cumbersome and costly to install and use.

SUMMARY

According to one aspect of the present invention there is provided a metering system for fibrous material, the metering system comprising:

an endless conveyor belt supported for rotation in a working direction on first and second rollers supported on a housing at spaced apart locations;

a plurality of pickup members supported on the belt, each pickup member being fastened to the belt at a trailing side thereof to project forwardly into the working direction of the conveyor belt to a leading side of the pickup member which is movable as the conveyor belt rotates between a closed position and an open position in which the leading side is spaced outwardly from the belt greater than in the closed position; and a container for storing fibrous material therein including an opening therein which receives a portion of the conveyor belt;

whereby rotation of the conveyor belt causes the pickup members to collect fibrous material between the pickup members and the belt as the belt is rotated through the container and causes the pickup members to be deflected into the open position at the second roller for dispensing a metered amount of fibrous material from pickup members at the second roller.

According to a second aspect there is provided a method of metering a fibrous material into a concrete mixture, the method comprising:

providing a metering system including an endless conveyor belt supported for rotation in a working direction on first and second rollers supported on a housing at spaced apart locations and a plurality of pickup members supported on the belt which are fastened to the belt at a trailing side thereof to project forwardly into the working direction of the conveyor belt to a leading side of the pickup member in which the pickup member is movable as the conveyor belt rotates between a closed position and an open position in which the leading side is spaced outwardly from the belt greater than in the closed position;

providing a container of fibrous material which receives the conveyor belt therethrough; and rotating the conveyor belt to collect fibrous material between the pickup members and the belt as the belt is rotated through the container and to deflect the pickup members into the open position at the second roller for dispensing a metered amount of fibrous material from pickup members at the second roller.

The use of a conveyor having pickup members thereon in communication with an open container of fibrous material permits any brand or type of fibres to be readily used while still maintaining a consistent delivery of discharge of fibres which is proportional to the movement of the conveyor. The configuration of the pickup members readily permits the fibrous material to be collected and subsequently released as the belt extends about the rollers.

A gate mechanism may be located at the opening in the container for restricting passage of fibrous material which has not been collected by one of the pickup members.

The gate mechanism preferably comprises at least one gate panel which is movable between a closed position directly adjacent an outer surface of the belt and an open position spaced from the belt to permit passage of a pickup member therebetween.

There may be provided a plurality of gate panels, each in alignment with a respective one of the pickup members.

Preferably each gate panel is pivotally supported on the container and biased towards the closed position.

There may be provided a sweeper mechanism rotatably supported adjacent the second roller for engaging the pickup members in the open position adjacent the second roller. The sweeper mechanism is preferably supported for rotation in a direction opposite to the conveyor belt. The sweeper mechanism may include a plurality of resilient sweeping members having a leading face of cloth material.

The sweeper mechanism may be coupled to one of the rollers such that rotation of the sweeper mechanism is driven by rotation of the rollers. The sweeper mechanism is preferably arranged to rotate at a greater speed of rotation than the second roller.

The conveyor belt preferably has outer surface of smooth material having a low coefficient of friction to reduce collection of unwanted and non-metered fibrous material thereon.

The pickup members may be spaced laterally and longitudinally from one another on the conveyor belt.

Each pickup member preferably comprises a plurality of tines secured to the belt at a trailing side to extend to respective free ends at the leading side thereof.

In accordance with one embodiment, the container may be positioned directly above the first roller wherein the pickup members are in the open position as the pickup members are rotated through the container. In this instance, the first roller is preferably greater in diameter than the second roller. The container may surround the first roller with the opening being located in a wall of the container facing the second roller.

Alternatively, the container may be supported above the conveyor belt between first and second rollers for communication with the conveyor belt through an open bottom end of the container in a further embodiment. The pickup members in this instance are preferably spaced from the belt in the closed position at an adjustable spacing.

BRIEF DESCRIPTION OF THE DRAWINGS

In the accompanying drawings, which illustrate exemplary embodiments of the present invention.

DETAILED DESCRIPTION

Figure 1:
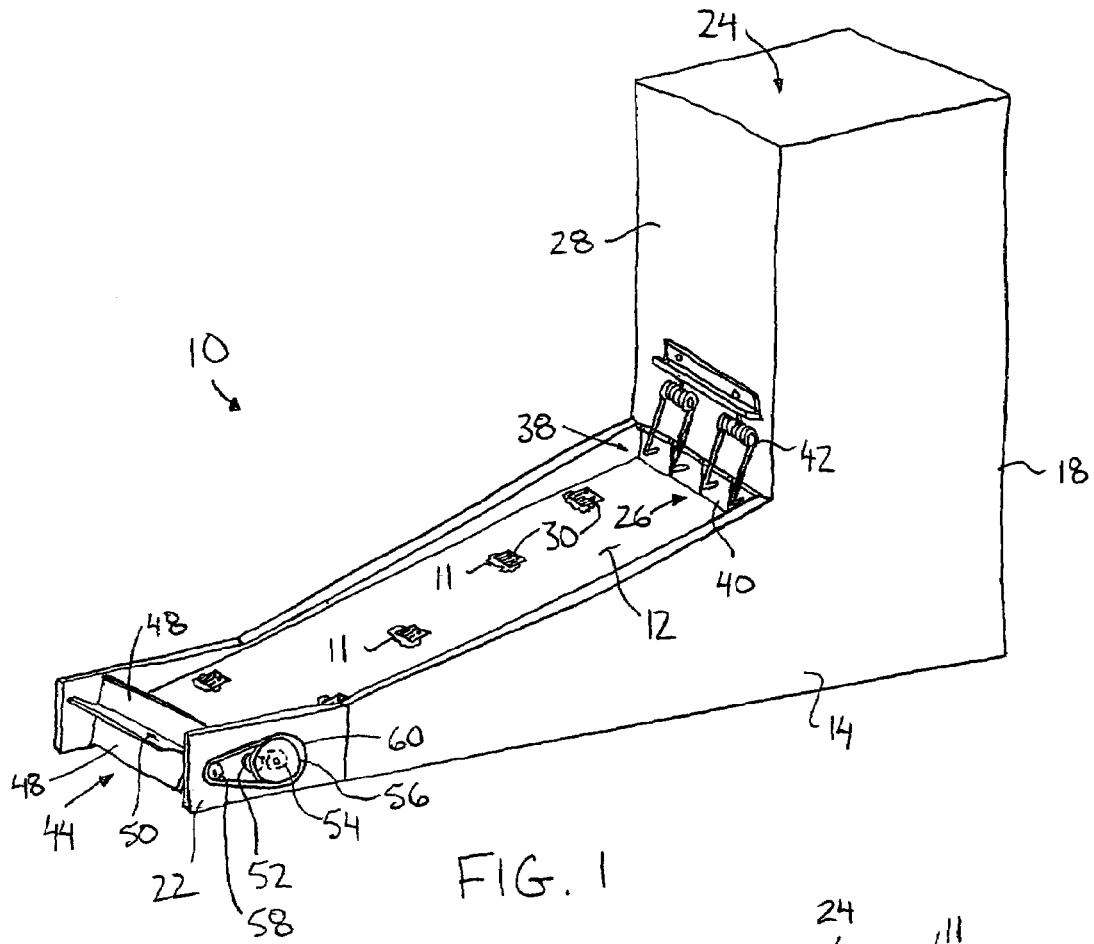
FIG. 1 is a perspective view of the metering system according to a first embodiment with a cover of the housing shown removed.
Figure 2:
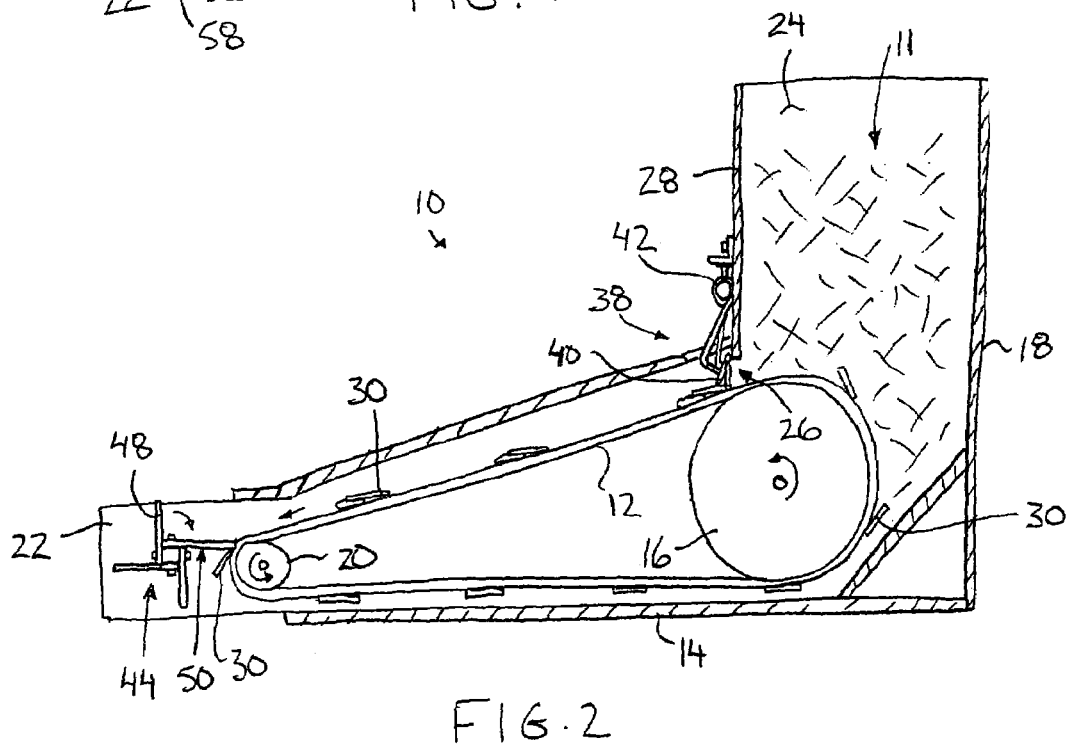
FIG. 2 is a sectional side elevational view of the metering system according to the embodiment of FIG. 1.
Figure 3:
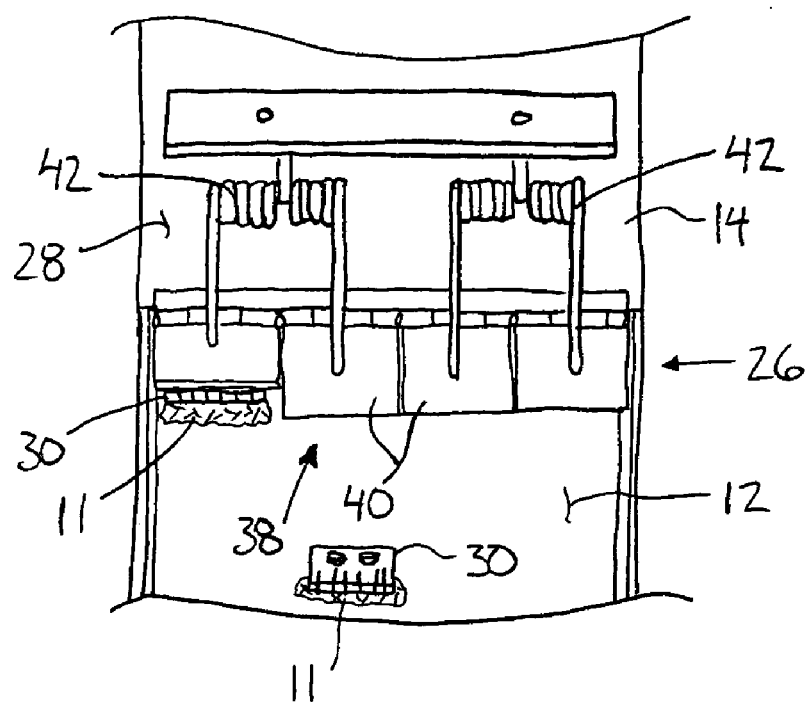
FIG. 3 is a front elevational view along the line 3—3 of FIG. 2.
Figure 4:
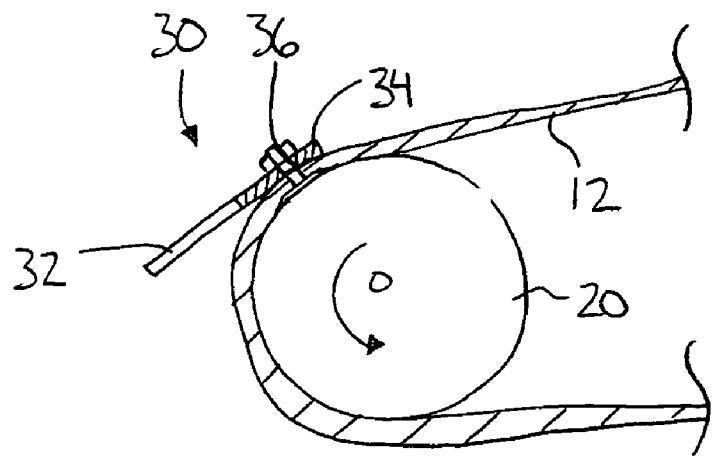
FIG. 4 is an enlarged section of one of the pickup members secured to the belt adjacent the second roller at the dispensing end in the first embodiment.
Figure 5:
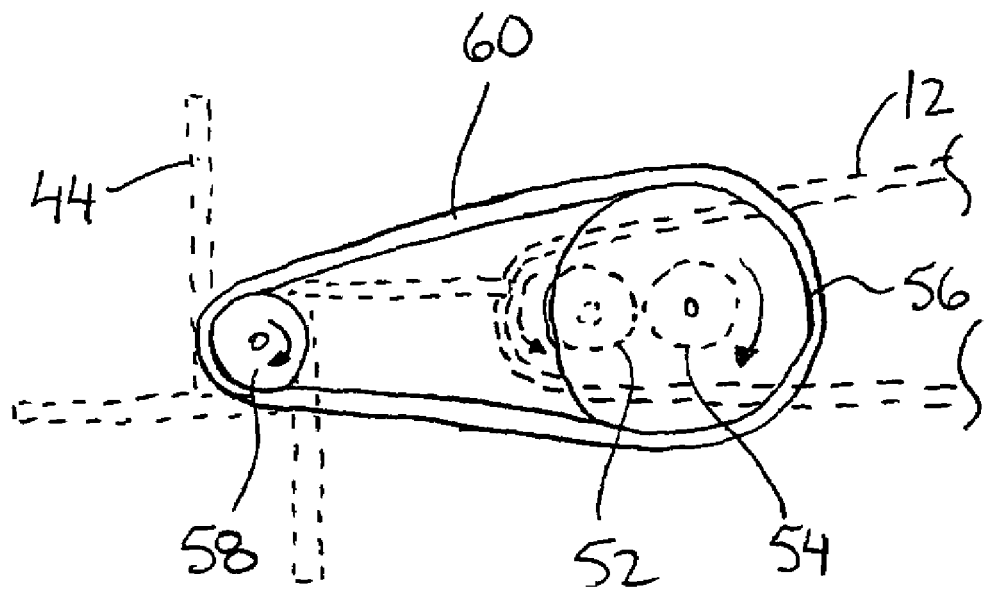
FIG. 5 is a side elevational view of the gearing system which drives the sweeper of the metering system.
Figure 6:
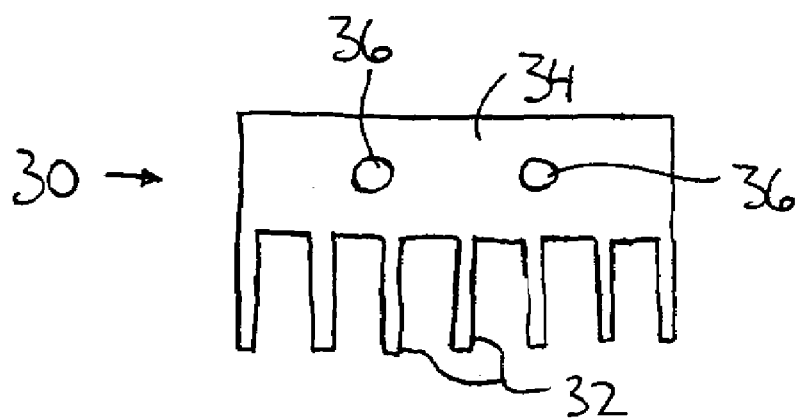
FIG. 6 is a top plan view of one of the pickup members.

Referring to the accompanying drawings, there is illustrated a metering system generally indicated by reference numeral 10. The system is particularly useful for metering fibrous material into a mixture, for example manufactured fibres of nylon or polypropylene manufactured under trade names such as Fibre Mesh and Nycon into a concrete mixture.

While two embodiments are illustrated in the accompanying figures, the common features of both will first be described herein. The system generally includes a conveyor belt 12 which is supported for rotation within a housing 14. The housing includes a first roller 16 rotatably supported at a feed end 18 of the housing and a second roller 20 rotatably supported at a dispensing end 22 of the housing. The first and second rollers are cylindrical members which are rotated about respective axes which are horizontally spaced, parallel to one another at opposing ends of the housing.

The conveyor belt 12 is an endless belt spanning between the first and second rollers about which it rotates. A suitable tensioning mechanism ensures that the first and second rollers and the conveyor belt all rotate together in a common working direction. The conveyor belt itself is a broad, flat and flexible member having an outer surface which is smooth so as to have minimal friction, for example the belt may comprise a food grade rubber.

A container 24 is supported on the housing adjacent the first roller 16 and includes an open bottom end supported directly above the conveyer. An opening 26 is provided in a front wall 28 of the container which faces the second roller 20 to receive the conveyor and material gathered thereon through the opening 26. The container is filled with fibrous material 11 to be picked up onto the conveyor belt.

The fibrous material is collected by pickup members 30 which are attached to the outer surface of the conveyor belt. Each pickup member 30 generally comprises a comb having a plurality of parallel and spaced apart tines 32 which lie in a generally common plane with one another attached by a base 34 lying in the common plane with the tines. The base portion 34 of the pickup member includes a pair of fastener apertures 36 formed therein to mount the pickup member to the belt. The pickup members are mounted onto the conveyor such that the fastener apertures in the base are located at the trailing side of the pickup member with the tines extending into the working direction of rotation of the belt towards respective free ends at the leading side of the pickup member.

Each pickup member is approximately equal to or slightly less than one quarter of a width of the conveyor belt when the pickup members are oriented in four longitudinally extending rows extending in the direction of travel of the belt. Pickup members 30 within each row are longitudinally misaligned with pickup members of adjacent rows such that all of the pickup members are spaced from one another both in a longitudinal direction and in a lateral direction.

The pickup members are only fastened to the belt by the fastener apertures in the base at the trailing side so that the free ends at the leading side of the pickup members are movable relative the belt as the belt is rotated about the rollers at each end of the housing. As the pickup members are rotated along with the belt from a straight portion spanning between the rollers to a curved portion of the belt wrapped about one of the rollers the pickup member are displaced relative to the belt into an open position. In the open position at the curved portion of the belt, the tines lie tangentially to the roller so as to be spaced at the free ends from the belt an amount greater than when in the closed position. In the closed position the tines lie parallel to the belt.

A gate mechanism 38 is provided at the opening 26 in the front wall of the container to restrict passage of fibrous material from leaving the container which is not captured within one of the pickup members. The gate mechanism 38 comprises plural gate panels 40 which are hinged on the front wall of the container at a periphery of the opening receiving the conveyor therethrough adjacent a top side of the conveyor when the conveyor is rotating in a direction such that the top side of the conveyor exits the container. The gate panels 40 span a portion of the opening in the front wall of the container between a periphery of the opening and the outer surface of the belt 12 to act as a wiper for wiping excess fibre from the conveyor belt to keep the excess fibre within the container. Each gate panel 40 is movable between a closed position in which the lower free end of the gate panel is positioned directly adjacent the outer surface of the belt and an open position in which the free end of the gate panel is displaced upwardly away from the outer surface of the belt to provide sufficient space for a respective pickup member to pass therebetween. One of the gate panels 40 is aligned with each longitudinal row of pickup members attached to the conveyor belt with each gate panel being approximately the same width or greater in width than a respective row of the pickup members. A coil spring 42 is coupled between each gate panel and the housing 14 which acts in a direction to bias the gate panel towards a closed position.

A sweeper 44 is provided at the dispensing end 22 of the housing adjacent the second roller 20. The sweeper generally comprises a shaft 46 having a plurality of resilient flaps 48 mounted thereon. The shaft 46 is supported on the housing to rotate about a respective axis lying parallel to the first and second rollers while being driven to rotate in an opposite direction than the rollers and the belt supported thereon. The shaft 46 is spaced horizontally from the second roller 20 on an opposite side than that of the first roller 16. Each flap 48 generally comprises a resilient member which is generally rectangular in shape to project radially outwardly from the shaft 46. The flaps are approximately equal in width to the conveyor belt 12 and have a length which spans between the shaft 46 and the outer surface of the belt 12 such that a free end of each flap 48 lies parallel to the shaft and is suitably spaced from the shaft to just meet the outer surface of the belt 12. A leading face 50 of each flap which faces into the direction of rotation includes a cloth surface or other suitable material which provides some limited friction for gripping fibres located on the tines of pickup members against which the flaps 48 of the sweeper 44 are rotated. The sweeper 44 is suitably positioned such that the free ends of the flaps contact the pickup members when they are near or approximately at the middle of the curvature of the belt about the second roller.

A drive mechanism is provided which drives rotation of the belt as well as the sweeper 44 in opposite directions. The drive mechanism preferably includes a motor (not shown) which is coupled to either the first or second rollers to drive both the rollers and the conveyor belt together in a common direction. A shaft of the second roller 20 includes a drive gear 52 coupled to rotate therewith which meshes with a first idler gear 54 which is near in size to the drive gear. The first idler 54 is coupled to rotate with a second idler 56 on a common shaft so that both the first and second idler gears rotate together opposite the direction of the drive gear 52 to which the first idler gear 54 meshes. A driven gear 58 is coupled to the shaft 46 of the sweeper to rotate together. The driven gear is coupled to rotate with the second idler gear 56 by a suitable chain drive 60 so that the driven gear 56 and the shaft 46 rotate with the idler gears in a common direction which is opposite to that of the first and second rollers and the conveyor belt. The driven gear 58 on the shaft of the sweeper is considerably smaller than the second idler gear which drives it while the first idler gear and drive gear 52 are approximately equal in size such that the gearing is suitably configured to cause to sweeper to rotate at two or more times faster than the speed of the second roller so that the flaps of the sweeper contact the belt at a substantially greater linear velocity to assist in removal of fibrous material from the tines of the pickup members.

In use, the belt is rotated in engagement with fibrous materials stored in the container so that the tines of the pickup members are advanced through the fibrous material to be collected thereon. Supporting the container to communicate with the conveyor belt through an open bottom end permits a consistent mass of fibres to be collected through a gravity feed configuration in the container. The gate members contact the belt at a straight section of the belt, downstream from the first roller. The rigid construction of the pickup member causes the gate panel to be opened as the pickup member passes, however the coil spring subsequently acts to immediately close the gate panel to restrict further fibrous material from exiting once the pickup member has passed. The smooth outer surface of the conveyor belt which has a low coefficient of friction further assists in preventing fibrous material from exiting the container other than that which is collected on respective pickup members. The sweeper and the small diameter of the second roller work together to fully release the fibrous materials at the dispensing end of the housing in a consistent manner. By simply adjusting the speed of rotation of the conveyor belt, the amount of fibrous material metered can be readily controlled.

Turning now more specifically to FIGS. 1 through 6, the first embodiment will now be described in further detail. In the first embodiment, the first roller 16 is much larger in diameter than the second roller 14 with the belt spanning substantially horizontally between the bottom sides of the rollers such that the top side of the belt rotates at a downward incline into the working direction of rotation from the first roller to the second roller.

The container 24 of the housing in this instance is located directly at the first roller 16 such that the first roller is housed in the bottom of the container with the container fully surrounding the roller and extending upwardly therefrom so that the fibrous material is gravity fed downwardly through the open bottom end of the container onto the conveyor belt at the first roller.

The pickup members are thus movable into the open position due to curvature of the belt at the first roller so that particulate material is caught in the space formed between the tines at the free ends of the pick up members and the belt. The pickup members 30 in this instance are secured directly adjacent the belt at the trailing side thereof in such a manner that the tines normally lie flat against the belt when no fibrous material is received therebetween.

In operation as the tines are displaced away from the belt due to curvature of the belt at the first roller, fibrous material is caught between the tines and the belt to be subsequently clamped and securely squeezed between the tines and the belt as the tines are urged back into the closed position flat against the belt along the flat section of the belt between the rollers.

The pickup members pass through the gates in this closed and clamped position before being opened again at the second roller. By providing a second roller which is smaller in diameter than the first roller, spacing of the tines from the belt is greater than spacing in the open position at the first roller and is considerably greater in spacing than in the closed and clamped position between the rollers due to the small radius of curvature of the second roller.

Figure 7:
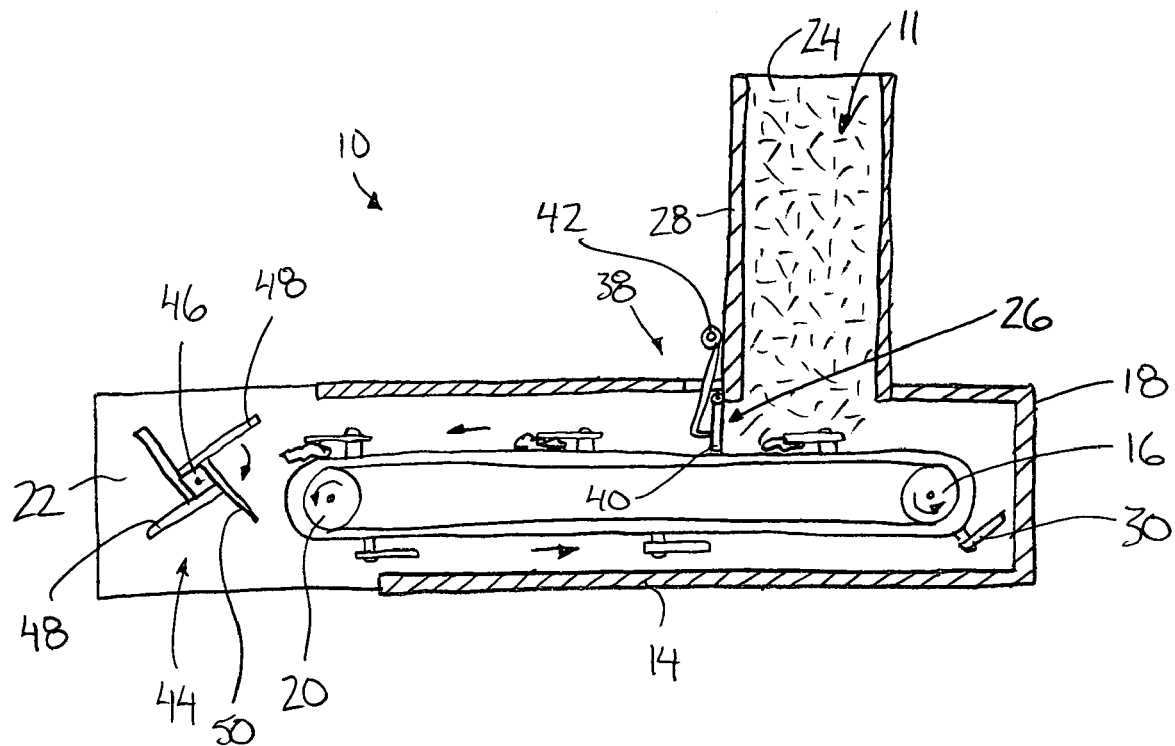
FIG. 7 is a sectional side elevational view of a second embodiment of the metering system.
Figure 8:
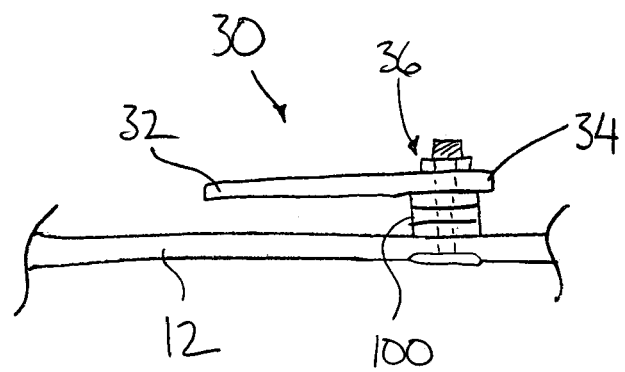
FIG. 8 is an enlarged section of one of the pickup members secured to the belt according to the second embodiment.

Turning now to FIGS. 7 and 8 the second embodiment will now be described in further detail. The container in this instance is mounted directly above the belt between the first and second rollers, but nearer to the first roller. The open bottom end of the container thus communicates with the conveyor belt at a straight section of the belt spanning between the rollers.

The pickup members 30 in this instance are also normally parallel to the belt when closed, however suitable washers 100 are provided between the pickup members and the belt about the fasteners secured through the mounting apertures 36 of the pickup members. Threaded fasteners are used to permit adjustment of the spacing by selecting the number and thickness of the washers to be used in mounting the pickup members to the belt. Spacing of the tines from the belt is desirable to accommodate different feed rates and different types of fibres that might be metered.

The pickup members extend through the container in the closed position with the tines parallel and spaced from the belt in which fibrous material is gathered in the space between the tines and the belt in a metered amount due to the consistent spacing of the tines from the belt. The pickup members again pass through the gates in the closed position before reaching the second roller 20 at which point the curvature of the belt again causes the pickup members to move relative to the belt at the free end thereof to a spacing which is greater than the spacing of the tines to the belt in the closed position.

Movement of the free ends of the pickup members relative to the belt in the open position at the second roller in cooperation with the sweeper mechanism act to dispense the fibrous material from a conveyor belt to exit an opening in the bottom of the housing of the system.

While various embodiments of the present invention have been described in the foregoing, it is to be understood that other embodiments are possible within the scope of the invention. The invention is to be considered limited solely by the scope of the appended claims.

The invention claimed is:

1. A metering system for fibrous material, the metering system comprising:
   an endless conveyor belt supported for rotation in a working direction on first and second rollers supported on a housing at spaced apart locations;
   a plurality of pickup members supported on the belt, each pickup member being fastened to the belt at a trailing side thereof to project forwardly into the working direction of the conveyor belt to a leading side of the pickup member which is movable as the conveyor belt rotates between a closed position and an open position in which the leading side is spaced outwardly from the belt greater than in the closed position;
   a container for storing fibrous material therein including an opening therein which receives a portion of the conveyor belt; and
   a gate mechanism at the opening in the container for restricting passage of fibrous material which has not been collected by one of the pickup members, the gate mechanism being movable between a closed position adjacent an outer surface of the belt and an open position spaced from the belt to permit passage of a pickup member therebetween and the gate mechanism being biased towards the closed position;
   whereby rotation of the conveyor belt causes the pickup members to collect fibrous material between the pickup members and the belt as the belt is rotated through the container and causes the pickup members to be deflected into the open position at the second roller for dispensing a metered amount of fibrous material from the pickup members at the second roller.

2. A system according to claim 1 wherein the gate mechanism comprises a plurality of gate panels, each in alignment with a respective one of the pickup members.

3. The system according to claim 1 wherein the gate mechanism comprises a plurality of gate panels pivotally supported on the container.

4. The system according to claim 1 wherein there is provided a sweeper mechanism rotatably supported adjacent the second miter for engaging the pickup members in the open position adjacent the second roller.

5. The system according to claim 1 wherein the conveyor belt includes an outer surface of smooth material having a low coefficient of friction.

6. The system according to claim 1 wherein the pickup members are spaced laterally and longitudinally from one another on the conveyor belt.

7. The system according to claim 1 wherein each pickup member generally comprises a plurality of tines secured to the belt at a trailing side to extend to respective free ends at the leading side thereof.

8. The system according to claim 1 wherein the container is positioned directly above the first roller and wherein the pickup members are in the open position as the pickup members are rotated through the container.

9. The system according to claim 8 wherein the first roller is greater in diameter than the second roller.

10. The system according to claim 8 wherein the container surrounds the first roller, the opening being located in a wall of the container facing the second roller.

11. The system according to claim 1 wherein the container is supported above the conveyor belt between first and second rollers for communication with the conveyor belt through an open bottom end of the container.

12. The system according to claim 11 wherein the pickup members are spaced from the belt in the closed position at an adjustable spacing.

13. A metering system for fibrous material, the metering system comprising:
    an endless conveyor belt supported for rotation in a working direction on first and second rollers supported on a housing at spaced apart locations;
    a plurality of pickup members supported on the belt each pickup member being fastened to the belt at a trailing side thereof to project forwardly into the working direction of the conveyor belt to a leading side of the pickup member which is movable as the conveyor belt rotates between a closed position and an open position in which the leading side is spaced outwardly from the belt greater than in the closed position;
    a container for storing fibrous material therein including an opening therein which receives a portion of the conveyor belt; and
    a sweeper mechanism rotatably supported adjacent the second roller for engaging the pickup members in the open position adjacent the second roller, the sweeper mechanism being coupled to one of the rollers such that rotation of the sweeper mechanism is driven by rotation of the rollers;
    whereby rotation of the conveyor belt causes the pickup members to collect fibrous material between the pickup members and the belt as the belt is rotated through the container and causes the pickup members to be deflected into the open position at the second roller for dispensing a metered amount of fibrous material from the pickup members at the second roller.

14. The system according to claim 13 wherein the sweeper is supported for rotation in a direction opposite to the conveyor belt.

15. The system according to claim 13 wherein the sweeper mechanism includes a plurality of resilient sweeping members having a leading face of cloth material.

16. The system according to claim 13 wherein the sweeper mechanism is arranged to rotate at a greater speed of rotation than the second roller.

17. A metering system for fibrous material, the metering system comprising:

an endless conveyor belt supported for rotation in a working direction on first and second rollers supported on a housing at spaced apart locations;

a plurality of pickup members supported on the belt, each pickup member being fastened to the belt at a trailing side thereof to project forwardly into the working direction of the conveyor belt to a leading side of the pickup member which is movable as the conveyor belt rotates between a closed position and an open position in which the leading side is spaced outwardly from the belt greater than in the closed position; and a container for storing fibrous material therein including an opening therein which receives a portion of the conveyor belt;

whereby rotation of the conveyor belt causes the pickup members to collect fibrous material between the pickup members and the belt as the belt is rotated through the container and causes the pickup members to be deflected into the open position at the second roller for dispensing a metered amount of fibrous material from the pickup members at the second roller;

wherein the container is supported above the conveyor belt between first and second rollers for communication with the conveyor belt through an open bottom end of the container; and wherein the pickup members are spaced from the belt in the closed position at an adjustable spacing.

* * * * *